US008331559B2

(12) United States Patent
Lee (10) Patent No.: US 8,331,559 B2
(45) Date of Patent: Dec. 11, 2012

(54) DIFFUSED DATA ENCRYPTION/DECRYPTION PROCESSING METHOD

(76) Inventor: Chiou-Haun Lee, Taichung (TW)

(*) Notice: Subject to any disclaimer, the term of this patent is extended or adjusted under 35 U.S.C. 154(b) by 952 days.

(21) Appl. No.: 12/365,160

(22) Filed: Feb. 3, 2009

(65) Prior Publication Data

US 2009/0161865 A1    Jun. 25, 2009

Related U.S. Application Data

(63) Continuation-in-part of application No. 10/963,014, filed on Oct. 12, 2004, now abandoned.

(51) Int. Cl.
  *H04K 1/00* (2006.01)
  *H04K 1/04* (2006.01)
  *H04K 1/06* (2006.01)
  *H04L 9/00* (2006.01)
  *H04L 9/28* (2006.01)
  *G06F 11/30* (2006.01)
  *G06F 12/14* (2006.01)

(52) U.S. Cl. ............... 380/38; 380/28; 380/29; 380/37; 380/200; 380/263; 380/278; 713/187; 713/189

(58) Field of Classification Search ............... 380/28, 380/37, 38, 200, 263, 278, 29; 713/187, 713/189
See application file for complete search history.

(56) References Cited

U.S. PATENT DOCUMENTS

| | | | | |
|---|---|---|---|---|
| 4,322,577 A * | 3/1982 | Brandstrom | | 380/37 |
| 5,511,123 A * | 4/1996 | Adams | | 380/29 |
| 5,727,062 A * | 3/1998 | Ritter | | 380/37 |
| 6,182,216 B1 * | 1/2001 | Luyster | | 713/168 |
| 6,219,421 B1 * | 4/2001 | Backal | | 380/28 |
| 6,907,509 B2 * | 6/2005 | Hall et al. | | 711/201 |
| 7,702,099 B2 * | 4/2010 | Lee | | 380/28 |
| 2002/0016773 A1 * | 2/2002 | Ohkuma et al. | | 705/50 |
| 2002/0021801 A1 * | 2/2002 | Shimoyama et al. | | 380/29 |
| 2002/0163658 A1 * | 11/2002 | Schluter et al. | | 358/1.9 |
| 2003/0039355 A1 * | 2/2003 | McCanny et al. | | 380/37 |
| 2003/0056118 A1 * | 3/2003 | Troyansky et al. | | 713/201 |
| 2003/0068036 A1 * | 4/2003 | Macchetti et al. | | 380/29 |
| 2004/0120518 A1 * | 6/2004 | Macy et al. | | 380/29 |
| 2004/0202326 A1 * | 10/2004 | Chen et al. | | 380/263 |
| 2005/0108313 A1 * | 5/2005 | Fujisaki et al. | | 708/520 |
| 2005/0108555 A1 * | 5/2005 | Sibert | | 713/187 |
| 2005/0249349 A1 * | 11/2005 | Ghaffar et al. | | 380/28 |
| 2006/0041762 A1 * | 2/2006 | Ma | | 713/189 |

OTHER PUBLICATIONS

Eisenberg, Murray, "Hill Ciphers and Modular Linear Algebra," (Nov. 3, 1999).*

* cited by examiner

*Primary Examiner* — Edan Orgad
*Assistant Examiner* — Kari Schmidt (57) ABSTRACT

The present invention discloses a diffused data encryption/decryption processing method, which comprises a plaintext, being at least a 2D matrix; and a password, being at least a 2D matrix; such that the password determines the starting point of the diffusion, the length of the diffusion, the cycle of diffusion, the number of encrypted diffusions and the number of decrypted diffusions to perform the diffusion computation of the plaintext as to achieve the purpose of processing the encryption and decryption.

11 Claims, 6 Drawing Sheets

DIFFUSED DATA ENCRYPTION/DECRYPTION PROCESSING METHOD

CROSS REFERENCE TO RELATED APPLICATIONS

This application is a continuation in part of the prior USPTO patent application titled "Diffusion Data Encryption/Decryption Processing Method" filed on Oct. 12, 2004, Ser. No. 10/963,014 by Lee, which is incorporated herein by reference in its entirety.

BACKGROUND OF THE INVENTION

1. Field of the Invention

The present invention relates to a data encryption/decryption processing method, more particularly to a method of encrypting and decrypting data directly by an n-dimensional diffused data displacement, exclusive or operation and continuous diffused iteration operation.

2. Description of the Related Art

A prior-art data encryption/decryption processing method combines a plaintext with a password to produce a ciphertext by performing iterated computations such as a displacement, an exclusive or operation and a transformation with a plaintext, a password and a bit-conversion table. The ciphertext can be converted back into the plaintext by computing the ciphertext and password with the same method. If other users do not have the original password, then the ciphertext cannot be converted back into the plaintext, and it thus can achieve the purpose of protecting confidential information. Basically, the prior art performs an one-dimensional logical computation and a 2D transformation on the plaintext and the password to produce an unrelated processing between the plaintext and the ciphertext. For processing the same data, an one-dimensional computation takes longer time than an n-dimensional computation, and the bit-conversion table makes it difficult to flexibly adjust the length of a processing block.

SUMMARY OF THE INVENTION

In view of the foregoing shortcomings of the prior art, the inventor of the present invention focused on the problems to start finding a way for the improvement and overcome the shortcomings in hope of finding a feasible solution, and conducted extensive researches and experiments and finally invented the diffused data encryption/decryption processing method in accordance with the present invention.

Therefore it is the primary objective of the present invention to replace the traditional conversion table by the iterated diffusions of the plaintext and password, not only can simplify the codes of the required program and perform the encryption and decryption processing for the 64/100/144/196/256-bit data or higher, but also can perform a chain block coding (CBC) after dividing the data into several blocks to encrypt several blocks simultaneously or encrypt continuous blocks in order to enhance the encryption level and reliability as well as shorten the processing time for the full text.

The technical measure taken by the present invention is described below:

A diffused data encryption/decryption processing method, comprises:
a plaintext, being at least a 2D matrix; and
a password, being at least a 2D matrix;
such that the password determines the starting point of the diffusion, the length of the diffusion, the cycle of diffusion, the number of encrypted diffusions and the number of decrypted diffusions to perform the diffusion computation of the plaintext as to achieve the purpose of processing the encryption and decryption.

BRIEF DESCRIPTION OF THE DRAWINGS

The above objects, features and advantages of the present invention will become apparent from the following detailed description taken with the accompanying drawing. However, these drawings are provided for reference and illustration and not intended to act as a limitation to the present invention.

DETAILED DESCRIPTION OF THE PREFERRED EMBODIMENTS

The diffused data encryption and decryption processing method according to the present invention comprises:
a plaintext, being at least a 2-dimensional matrix in binary digits; for example, the 8-character plaintext "smoother" is represented by the ASCII code "73 6D 6F 6F 74 68 65 72" and its corresponding binary 2-dimensional matrix is given in Table 1-1 below:

TABLE 1-1

| ASCII | | | | | | | |
| --- | --- | --- | --- | --- | --- | --- | --- |
| 73 | 6D | 6F | 6F | 74 | 68 | 65 | 72 |
| 1 | 1 | 1 | 1 | 0 | 0 | 1 | 0 |
| 1 | 0 | 1 | 1 | 0 | 0 | 0 | 1 |

TABLE 1-1-continued

| ASCII | | | | | | | |
|---|---|---|---|---|---|---|---|
| 73 | 6D | 6F | 6F | 74 | 68 | 65 | 72 |
| 0 | 1 | 1 | 1 | 1 | 0 | 1 | 0 |
| 0 | 1 | 1 | 1 | 0 | 1 | 0 | 0 |
| 1 | 0 | 0 | 0 | 1 | 0 | 0 | 1 |
| 1 | 1 | 1 | 1 | 1 | 1 | 1 | 1 |
| 1 | 1 | 1 | 1 | 1 | 1 | 1 | 1 |
| 0 | 0 | 0 | 0 | 0 | 0 | 0 | 0 | a password, being at least a 2-dimensional matrix in binary digits; for example, an eight-character password "Yourlips" is represented by the ASCII code "59 6F 75 72 6C 69 70 73" and its corresponding binary 2-dimensional matrix is given in Table 1-2 below:

TABLE 1-2

| ASCII | | | | | | | |
|---|---|---|---|---|---|---|---|
| 59 | 6F | 75 | 72 | 6C | 69 | 70 | 73 |
| 1 | 1 | 1 | 0 | 0 | 1 | 0 | 1 |
| 0 | 1 | 0 | 1 | 0 | 0 | 0 | 1 |
| 0 | 1 | 1 | 0 | 1 | 0 | 0 | 0 |
| 1 | 1 | 0 | 0 | 1 | 1 | 0 | 0 |
| 1 | 0 | 1 | 1 | 0 | 0 | 1 | 1 |
| 0 | 1 | 1 | 1 | 1 | 1 | 1 | 1 |
| 1 | 1 | 1 | 1 | 1 | 1 | 1 | 1 |
| 0 | 0 | 0 | 0 | 0 | 0 | 0 | 0 |

The password and plaintext binary table using coded mode of ASCII is just an exemplary for illustrating convenience only and it is not intended to limit the claim scope. Any others code converting can also be carried out the data diffusion. For example aside from ASCII, it can be Unicode, BCD, UTF-32 or any user defined binary code.

To make it easier for our examiner to understand the objective of the invention, its structure, innovative features, and performance, we use a preferred embodiment together with the attached drawings for the detailed description of the diffusion method, symbols and definition.

The diffusion method comprises a diffused area, and such area comprises a starting point of the diffusion being used as a diffusion center to diffuse data outward in sequence, and the diffused directions include a vertical direction and a horizontal direction. An exclusive or operation is performed on the value in the diffused area receiving a diffused value transmitted from the vertical and horizontal areas to produce a new value to be filled into the area, and such new value is used to continue the diffused value outward until the diffusion computation for the whole area is completed.

Accordingly, the forgoing diffusion concept and Symbols Definition for diffusion can be expressed as follows:

Symbols and Definition of Diffusion are given below:

$A(i, j)$: Matrix $A_{n \times m}$ is carried out a diffusion operation by using Point $(i, j)$ as the starting point so that matrix elements in the matrix are diffused in sequence outward.

$\overset{t}{A}(i, j)$: Matrix $A$ is repeatedly carried out the diffusion operation for $t$ times by using Point $(i, j)$ as the starting point.

For example, $$\overset{2}{A}(i, j) = A(i, j)(i, j) \quad \text{(a)}$$

$$\overset{1}{A}(i, j) = A(i, j) \quad \text{(b)}$$

$$\overset{0}{A}(i, j) = A \quad \text{(c)}$$

$\overset{t}{b}(i, j)$: Zero matrix uses Point $(i, j)$ as the starting point to repeat the diffusion for $t$ times.

For example, $$\overset{1}{b}(i, j) = b(i, j) \quad \text{(a)}$$

$$\overset{0}{b}(i, j) = b = 0 \quad \text{(b)}$$

where $b(i, j)$: is a matrix $b_{n \times m}$ with values 0 at all positions of the matrix except position $(i, j)$ with value 1, or a matrix with values 1 at all positions except position $(i, j)$ with value 0.

$\underset{p}{A}(i, j)$: Matrix $A$ uses Point $(i, j)$ as the starting point, and $p$ as the diffused length of successive positions.

For example, $$\underset{0}{A}(i, j) = A \quad \text{(a)}$$

$$\underset{1}{A}(i, j) = A(i, j) \quad \text{(b)}$$

$$\underset{2}{A}(i, j) = A(i, j)(i, j+1) \quad \text{(c)}$$

$\underset{p}{b}(i, j)$: Zero matrix Point $(i, j)$ as the starting point and $p$ as the diffused length of successive positions.

For example, $$\underset{1}{b}(i, j) = b(i, j) \quad \text{(a)}$$

$$\underset{0}{b}(i, j) = b = 0 \quad \text{(b)}$$

$\overset{t}{\underset{p}{A}}(i, j)$: Matrix $A$ uses Point $(i, j)$ as the starting point and $p$ as the diffused length of successive positions to repeat the diffusion for $t$ times.

For example, $$A(\overset{2}{\underset{2}{i}}, j) = A(i, j)(i, j+1)(i, j)(i, j+1) \quad (a)$$

$$A(\overset{2}{\underset{3}{i}}, j) = A(i, j)(i, j+1)(i, j+2)(i, j)(i, j+1)(i, j+2) \quad (b)$$

$A^t$: a resulted matrix after matrix A is carried out the diffusion operation for t times.

For example, $$A^t = A(\overset{t}{i, j}) \quad (a)$$

$$A^0 = A \quad (b)$$

$A^t(i, j)$: Matrix $A^t$ is carried out a diffusion operation by using Point (i, j) as the starting point.

$A_p$: a resulted matrix after matrix A is carried out the $p^{th}$ diffusion operation in either in successive positions with diffusion length p or not in successive positions.

For example, in case of:

(a) the matrix A before any diffusion operation can be expressed as $A_0$ i.e., $A_0=A$.

(b) the matrix processed a series of successive positions with diffusion length p.

$$A_p = A(\underset{p}{i, j})$$

(c) the matrix is not processed successive position diffusions but after previous position, $(p-1)^{th}$, diffusion by t times.

$$A_1{}^t = A_1{}^{t-1}(i, j) = A_2$$

$A_p(i, j)$: Matrix $A_p$ is carried out a diffusion operation by using Point (i, j) as the starting point.

$^k A$: a resulted matrix after matrix A is carried out the diffusion operation for k rows or k columns.

For example, (a) $^0 A = A$ $^k A(i, j)$: Matrix $^k A$ is carried out a diffusion operation by using Point (i, j) as the starting point.

Orders: $^k A > A_p > A^t > A(i, j)$

Formula: $A(i, j) = A \oplus Ac_i \oplus Ar_j \oplus b(i, j)$, $\oplus$: is an operator of logic XOR.

For example, $$A(\overset{2}{i}, j) = A(i, j)(i, j) = A(i, j) \oplus A(i, j)c_i \oplus A(i, j)r_j \oplus b(i, j)$$

$Ar_j$: is a row diffused outward matrix $A_{n \times m}$ about the $j^{th}$ row diffused outward to its nearest rows. i.e., $j^{th}$ row moved to the $(j-1)^{th}$ row and the $(j+1)^{th}$ row and so do the elements at the successive rows in sequence moved outward each by one row distance until they meet the border. Therefore, the positions at the $j^{th}$ row are filled with 0.

For example for a 4×4 matrix $$Ar_3 = \begin{matrix} a_{12} & a_{22} & a_{32} & a_{42} \\ a_{13} & a_{23} & a_{33} & a_{43} \\ 0 & 0 & 0 & 0 \\ a_{13} & a_{23} & a_{33} & a_{43} \end{matrix}$$

$Ac_i$: is a column diffused outward matrix $A_{n \times m}$ about the $i^{th}$ column diffused outward to its nearest columns, i.e., $i^{th}$ column moved to the $(i-1)^{th}$ column and the $(i+1)^{th}$ column and so do the elements at the successive columns in sequence moved outward each by one column distance until they meet the border. Therefore, the positions at the $i^{th}$ column are filled with 0.

For example for a 4×4 matrix $$Ac_2 = \begin{matrix} a_{21} & 0 & a_{21} & a_{31} \\ a_{22} & 0 & a_{22} & a_{32} \\ a_{23} & 0 & a_{23} & a_{33} \\ a_{24} & 0 & a_{24} & a_{34} \end{matrix}$$

After the matrix is diffused successively for r times, a cycle is produced, and Matrix A uses Point (i, j) as the starting point and p as the diffused length for successive positions to recover Matrix A after being diffused for r times. The equation is given below:

For the equation of the number of times of the diffusion:

$$p > 1: A(\overset{t}{\underset{p}{i, j}}) = A \to b(\overset{t}{\underset{p}{i, j}}) = 0$$

$$p = 1: A(\overset{t}{i, j}) = A \to b(\overset{t}{i, j}) = 0$$

r: p × t, and the relation between the cycle r and the matrix size is given in Table 2-1.

TABLE 2-1

| Diffused Length p | 1 | 2 | 3 | 4 | 5 |
|---|---|---|---|---|---|
| | 8 × 8 Matrix | | | | |
| Cycle r | 16 | 48 | 48 | 224 | 240 |
| | 10 × 10 Matrix | | | | |
| Cycle r | 32 | 96 | 96 | 224 | 240 |
| | 12 × 12 Matrix | | | | |
| Cycle r | 32 | 96 | 96 | 224 | 480 |

TABLE 2-1-continued

| Diffused Length p | 1 | 2 | 3 | 4 | 5 |
|---|---|---|---|---|---|
| 14 × 14 Matrix | | | | | |
| Cycle r | 32 | 96 | 96 | 448 | 480 |
| 16 × 16 Matrix | | | | | |
| Cycle r | 32 | 96 | 96 | 448 | 480 |

Note: (1) The cycle r in Table 2-1 depends on the matrix size n by m. cycle r can be expressed by $r=2^{K+1}$ where $k=\max(n, m)$, That is if a matrix is not a square matrix, then such matrix is applicable for the square matrix with the largest number of rows or fields. For example, the 8×16 matrix is applicable for the 16×16 square matrix. and $K=\lceil \log_2 k \rceil$, the ceiling value of $\log_2 k$. i.e. unconditional carry, for example: $K=2$ if $\log_2 k=1.1$ or $\log_2 k=2.0$; $K=3$ if $\log_2 k=2.1$ or $\log_2 k=2.9$.

(2) The zero matrix $b(i, j)$ either a matrix $b_{n \times m}$ with values 0 at all positions of the matrix except position $(i, j)$ with value 1 or a matrix $b_{n \times m}$ with values 1 at all positions of the matrix except position $(i, j)$ with value 0, does not affect the value of the cycle r.

(3) The cycle r represents the total number of time of diffusion for one starting point diffusion (e.g. single point diffusion). Hence, for 8×8 matrix with diffused length $p=5$ and total number of times of diffusion for one cycle $r=240$ as $$A(\overset{48}{\underset{5}{i, j}}) = A,$$

$r = p \times t = 5 \times 48 = 240$

Figure 1A:
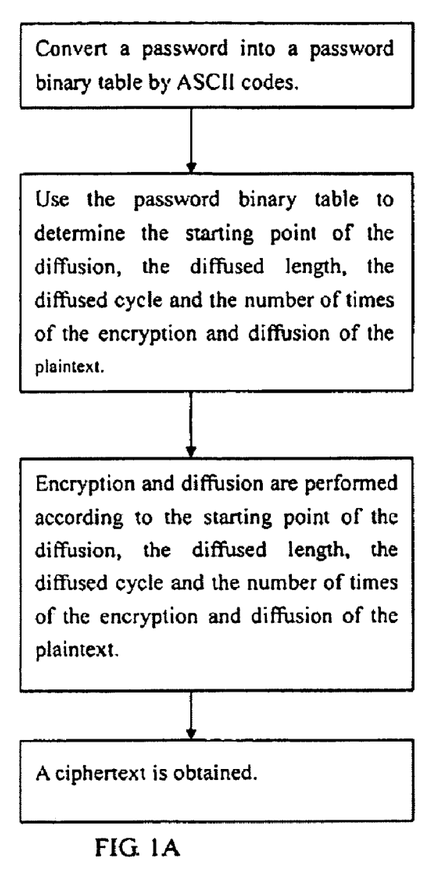
FIG. 1A is a flow chart of performing the encrypted diffusion computation according to the present invention.

With the understanding of the foregoing diffusion method and matrix diffusion related definitions, the procedure taken in the present invention is described as follows:

Please refer to FIG. 1A for the flow chart of an encryption according to the present invention, and its algorithm is described as follows:

1. Convert the plaintext and password into the plaintext binary table and the password binary table.
2. The $n^{th}$ field of the plaintext is taken as the diffused field, where $n=1\sim8$.
3. Use the value "1" of the $n^{th}$ field in the password binary table as the starting point of the diffusion to carry out the encryption and diffusion in sequence, and the diffused length p is "1" and the number of times of the diffusion is (Cycle r/2)−1. In the password binary table, the values in the $1^{st}$, $4^{th}$, $5^{th}$ and $7^{th}$ positions of the first field are all "1"s. Therefore, (1, 1) in the plaintext binary table is used as the starting point for the diffusion and "1" as the diffused length p for carrying out the encryption and diffusion. The number of times for the encryption and diffusion is (cycle r)/2−1, which means 7 times for each. The plaintext binary table produced after using (1, 1) as the starting point for the diffusion for carrying out the encryption and diffusion for 7 times. Parts of the equations are listed as follows:

$$A(1, 1) = A \oplus Ac_1 \oplus Ar_1 \oplus b(1, 1) = A^1 = \begin{bmatrix} 11110010 \\ 10110001 \\ 01111010 \\ 01110100 \\ 10001001 \\ 11111111 \\ 11111111 \\ 00000000 \end{bmatrix} \oplus$$

$$\begin{bmatrix} 01111001 \\ 01011000 \\ 00111101 \\ 00111010 \\ 01000100 \\ 01111111 \\ 01111111 \\ 00000000 \end{bmatrix} \oplus \begin{bmatrix} 00000000 \\ 11110010 \\ 10110001 \\ 01111010 \\ 01110100 \\ 10001001 \\ 11111111 \\ 11111111 \end{bmatrix} \oplus \begin{bmatrix} 10000000 \\ 00000000 \\ 00000000 \\ 00000000 \\ 00000000 \\ 00000000 \\ 00000000 \\ 00000000 \end{bmatrix} \oplus \begin{bmatrix} 00001011 \\ 00011011 \\ 11110110 \\ 00110100 \\ 10111001 \\ 00001001 \\ 01111111 \\ 11111111 \end{bmatrix} = A^1$$

$A^1(1, 1) = A^2$
$A^6(1, 1) = A^6 \oplus A^6c_1 \oplus A^6r_1 \oplus b(1, 1) = A^7 = A_1$ where the suffix of A is to point out the order of the diffused position and since the most repeating time of the diffusion is just seven. Thus it is provide for the initial matrix of the next position for diffusion.

Points (1,4), (1,5) and (1,7) are used in sequence as starting points for the diffusion to carry out the encryption and diffusion. Parts of the equations are listed as follows:

$A_1^6(1,4) = A_1^6 \oplus A_1^6 c_1 \oplus A_1^6 r_4 \oplus b(1,4) = A_2$ $A_3^6(1,7) = A_3^6 \oplus A_3^6 c_1 \oplus A_3^6 r_7 \oplus b(1,7) = A_4$ After the $1^{st}$ field is encrypted and diffused, the $2^{nd}$ field is encrypted sequentially as above. Parts of the equations with diffusion point (2,1) and (2,7)) are listed as follows:

$A_4(2,1) = A_4 \oplus A_4 c_2 \oplus A_4 r_1 \oplus b(2,1) = A_4$ $A_4^6(2,1) = A_4^6 \oplus A_4^6 c_2 \oplus A_4^6 r_1 \oplus b(2,1) = A_5$ $A_9(2,7) = A_9 \oplus A_9 c_2 \oplus A_9 r_7 \oplus b(2,7) = A_9^1$ $A_9^6(2,7) = A_9^6 \oplus A_9^6 c_2 \oplus A_9^6 r_7 \oplus b(2,7) = A_{10}$ The $3^{rd}$ field, the $4^{th}$ field, $5^{th}$ field to eighth field are encrypted and diffused in sequence. Parts of the equations are listed as follows:

$A_{27}(7,5) = A_{27} \oplus A_{27} c_7 \oplus A_{27} r_5 \oplus b(7,5) = A_{27}^1$ $A_{27}^6(2,7) = A_{27}^6 \oplus A_{27}^6 c_7 \oplus A_{27}^6 r_5 \oplus b(7,5) = A_{28}$ $A_{29}^6(7,7) = A_{29}^6 \oplus A_{29}^6 c_7 \oplus A_{29}^6 r_7 \oplus b(7,7) = A_{30}$ $A_{34}^6(8,7) = A_{34}^6 \oplus A_{34}^6 c_8 \oplus A_{34}^6 r_7 \oplus b(8,7) = A_{35} = C$ The C is the ciphertext binary matrix as shown in: table 3-1

TABLE 3-1

| 0 | 0 | 0 | 0 | 1 | 1 | 0 | 0 |
|---|---|---|---|---|---|---|---|
| 0 | 1 | 1 | 0 | 1 | 1 | 1 | 1 |
| 1 | 0 | 0 | 1 | 0 | 1 | 1 | 1 |
| 0 | 1 | 0 | 1 | 0 | 1 | 0 | 1 |
| 0 | 0 | 0 | 1 | 1 | 1 | 0 | 0 |
| 0 | 1 | 1 | 1 | 1 | 1 | 0 | 0 |

TABLE 3-1-continued

| 1 | 0 | 0 | 1 | 0 | 1 | 0 | 0 |
|---|---|---|---|---|---|---|---|
| 1 | 0 | 1 | 1 | 1 | 1 | 0 | 1 |

Figure 1B:
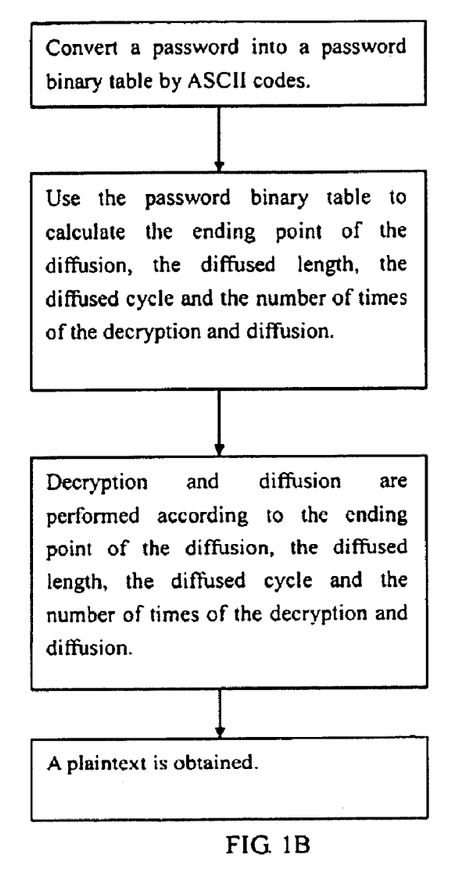
FIG. 1B is a flow chart of performing the decrypted diffusion computation according to the present invention.

For the principle of the decryption, the feature of the cycle r is used for the matrix diffusion, and the value "1" of the $n^{th}$ field in the password binary table is used as the starting point for the decryption and diffusion in a reverse sequence and the sum of the number of times of decryption and diffusion and the number of times of encryption is set to be the cycle r in order to decipher the ciphertext to the original plaintext. Its procedure is described in details by the following example:

Please refer to FIG. 1B for the flow chart of the decryption according to the present invention, and its algorithm is described as follows:

1. Convert the ciphertext and the password into the ciphertext binary table and the password binary table.
2. The $n^{th}$ field of the ciphertext is taken as the diffused field, where n=8~1.
3. Use the value "1" of the $n^{th}$ field in the password binary table as the starting point of the diffusion to carry out the decryption and diffusion in reverse sequence, and the diffused length p is "1" and the number of times of the diffusion is (Cycle r/2)+1. In the password binary table, the values in the $1^{st}$, $2^{nd}$, $5^{th}$, $6^{th}$ and $7^{th}$ positions of the first field are all "1"s. Therefore, (8, 7) in the ciphertext binary table is used as the starting point for the diffusion and "1" as the diffused length p for carrying out the decryption and diffusion. The number of times for the decryption and diffusion is (cycle r)/2+1, which means 9 times for each. Then, (8,6), (8,5), (8,2) and (8,1) are used as starting points for carrying out the decryption and diffusion. After the $8^{th}$ field is decrypted and diffused, the $7^{th}$, $6^{th}$, $5^{th}$ and so forth to $1^{st}$ fields of the ciphertext binary table are decrypted and diffused to recover the plaintext binary table.

Figure 1C:
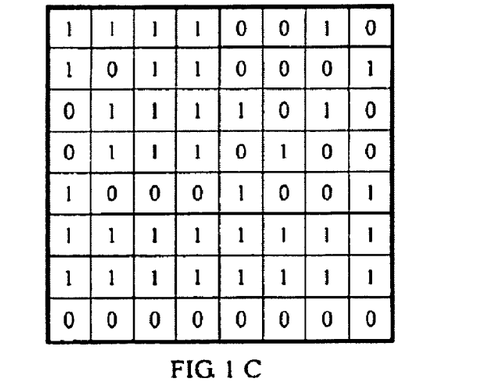
FIG. 1C is a table showing the corresponding positions between the plaintext and the password according to the present invention.

Please refer to FIG. 1C. If the plaintext and password are asymmetric square matrixes; for example, the plaintext is an 8×8 matrix and the password is a 4×4 matrix, then one area (as shown in the shaded gray area) corresponding to a password matrix is encrypted and diffused, and then diffused to the whole plaintext matrix for the encryption. Therefore, even the size of the password is smaller than the plaintext, the whole plaintext can be encrypted and the area corresponding to the password matrix can be change according to user's setup instead of being restricted to the upper left area of the figure. Further, the starting point of the diffusion for the encryption and decryption can be the value "0" at the $n^{th}$ field of the password binary table. The values of the number of times for the encryption and diffusion and the number of times for the decryption and diffusion are used as examples for the illustration only, but not used as a limitation to certain specific values for the number of times for the encryption and diffusion and the number of times for the decryption and diffusion. As far as the sum of the number of times for the encryption and diffusion and the number of times for the decryption and diffusion is equal to the cycle r, then it will be fine, and such values are used for describing the present invention only, but not for limiting the scope of the claims of the invention.

Figure 2A:
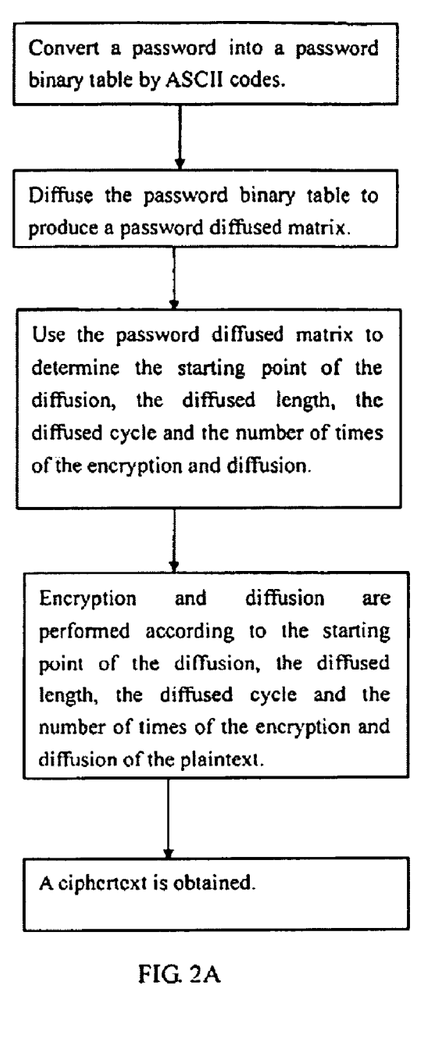
FIG. 2A is another flow chart of performing the encrypted diffusion computation according to the present invention.

In addition to the algorithm of the point to point diffused data encryption, the aforementioned first preferred embodiment, another algorithm of most successive diffused data encryption is shown in FIG. 2A. Please refer to FIG. 2A for the flow chart of another encryption according to the present invention, and its algorithm is given as follows:

1. Convert the plaintext and the password into the plaintext binary table and the password binary table (see table 1-1 and table 1-2).
2. Diffused the password binary table to produce a password diffused matrix (see table 3-5).
3. Use the password diffused matrix to determine the starting point of the diffused length, the diffused cycle and the number of times of the encryption and diffusion (see table 3-6).
4. The $n^{th}$ field of the plaintext is taken as the diffused field, where n=1~8.
5. Use the $n^{th}$ field in the password diffused matrix as the starting point of the diffusion to carry out the encryption and diffusion, and the diffused length p is >1 and the number of times of the diffusion is equal to (cycle r/2)-1.

To generate the password diffused matrix, the steps are as follows:

(a) Provides a predetermined position matrix and a regular position matrix, both of them have a matrix size at least 2 by 4 for the diffused binary matrix is generated by converting the password according to ASCII code. It is thus the predetermined position matrix can be filled in with numerals 1 to 8 in a predetermined order as matrix elements, each predetermined position $P_s$ represents a diffused zero matrix b(i, j) and the regular position matrix is filled in numerals 1 to 8 in a increasing order as matrix elements (b) Lets w=1;

(c) Gets 8 bits from the $w^{th}$ field of said password binary matrix and rearranged them to obtain a matrix B according to the predetermined position matrix;

(d) Lets s=1;

(e) Performs single point diffusion process beginning from $P_s$=b(i, j) to obtain $B_s$ where $B_s = B \oplus Bc_i \oplus Br_j \oplus b(i, j)$;

(f) Takes a string with 8 bits from the $B_s$, according to the predetermined position matrix;

(g) If the string has one most successive length either '1" or "0" then the string is the required string for the $w^{th}$ field, otherwise the matrix $B_s$ is rearranged to obtain a renewed matrix B according to the regular order matrix and lets s=s+1 backing to the step (e);

(h) If w=n then the steps of obtaining the password diffused matrix is ended;

(i) Lets w=w+1;

(j) Going back to step (c).

Please note the password diffused matrix established under the conditions of (1) the predetermined position matrix has a size of 4 by 4 (please see Table 3-2), the extra positions s=9 to s=16 are all filled in with "1", and (2) the most successive length is limited to be 5 due to the table 2-1, which shows p=5 is the most successive length.

| Table 3-2-1 | | | | | Table 3-2 | | | |
|---|---|---|---|---|---|---|---|---|
| 1 | 5 | 9 | 13 | | 16 | 2 | 3 | 13 |
| 2 | 6 | 10 | 14 | → | 5 | 11 | 10 | 8 |
| 3 | 7 | 11 | 15 | | 9 | 7 | 6 | 12 |
| 4 | 8 | 12 | 16 | | 4 | 14 | 15 | 1 |

Herein parts of the derivative processes (the $1^{st}$ field to the $3^{rd}$ field are shown to verify the password diffused matrix, the table 3-5 accordingly).

The $1^{st}$ field of the password diffused matrix: "11100000."

Take the first field of the password binary matrix, table 1-2: 10011010 and rearranged in accordance with the table 3-2 and implemented the first point s=1 Position (4,4) diffusion. Note starting diffusion position s=b(4,4) is incorporated into the column diffusion out matrix $Bc_4$.

| Table 3-3 | | | | | | | | | | | | | | | | Table 3-4 | | | |
|---|---|---|---|---|---|---|---|---|---|---|---|---|---|---|---|---|---|---|---|
| 1 | 0 | 0 | 1 | | 0 | 0 | 1 | 0 | | 1 | 1 | 1 | 0 | | 0 | 1 | 0 | 1 |
| 1 | 1 | 1 | 0 | $\oplus$ | 1 | 1 | 0 | 0 | $\oplus$ | 1 | 1 | 0 | 1 | = | 1 | 1 | 1 | 1 |
| 1 | 1 | 0 | 1 | | 1 | 0 | 1 | 0 | | 1 | 1 | 1 | 1 | | 1 | 0 | 0 | 0 |
| 1 | 1 | 1 | 1 | | 1 | 1 | 1 | 1 | | 0 | 0 | 0 | 0 | | 0 | 0 | 0 | 0 |

The values taken out from the resulted matrix are "01001001." It presents two successive length p=2. Therefore it failed to meet the condition of one most successive length.

The table 3-1 is then rearranged according to the regular order position table 3-2-1 to obtain a newel matrix table 3-4-1 for s=2, the point (2,1) diffusion.

| Table 3-4-1 | | | | | | | | | | | | | | | | Table 3-4-2 | | | |
|---|---|---|---|---|---|---|---|---|---|---|---|---|---|---|---|---|---|---|---|
| 0 | 1 | 1 | 1 | | 1 | 1 | 1 | 1 | | 0 | 0 | 0 | 0 | | 1 | 0 | 0 | 0 |
| 1 | 0 | 1 | 0 | $\oplus$ | 0 | 0 | 0 | 1 | $\oplus$ | 0 | 1 | 1 | 1 | = | 1 | 1 | 0 | 0 |
| 0 | 0 | 1 | 0 | | 0 | 0 | 0 | 1 | | 1 | 0 | 1 | 0 | | 1 | 0 | 0 | 1 |
| 0 | 1 | 0 | 0 | | 1 | 0 | 1 | 0 | | 0 | 0 | 1 | 0 | | 1 | 1 | 0 | 0 |

The values taken out from the resulted matrix table 3-4-2 are "00011000." It has two successive positions p=3 so that it does not meet the condition of one most successive length.

The table 3-4-2 is then rearranged according to the regular order position table 3-2-1 and the resulted matrix is table 3-4-3. Subsequently, the diffusion is implemented using s=3, point (3,1) diffusion.

| Table 3-4-3 | | | | | | | | | | | | | | | | Table 3-4-4 | | | |
|---|---|---|---|---|---|---|---|---|---|---|---|---|---|---|---|---|---|---|---|
| 0 | 1 | 1 | 0 | | 1 | 1 | 1 | 1 | | 0 | 0 | 0 | 0 | | 1 | 0 | 0 | 1 |
| 0 | 0 | 0 | 1 | $\oplus$ | 0 | 0 | 0 | 0 | $\oplus$ | 0 | 1 | 1 | 0 | = | 0 | 1 | 1 | 1 |
| 0 | 0 | 1 | 0 | | 0 | 1 | 0 | 1 | | 0 | 0 | 0 | 1 | | 0 | 1 | 1 | 0 |
| 1 | 0 | 1 | 1 | | 0 | 1 | 0 | 1 | | 0 | 0 | 1 | 0 | | 1 | 1 | 0 | 0 |

The values taken from the resulted matrix are "00010111." It has two successive positions p=3 so that it does not meet the condition of one most length.

The table 3-4-4 is then rearranged according to the regular order position table 3-2-1 and the resulted matrix is table 3-4-5. Subsequently, the diffusion is implemented using s=4, point (1,4) diffusion

| Table 3-4-5 | | | | | | | | | | | | | | | | Table 3-4-6 | | | |
|---|---|---|---|---|---|---|---|---|---|---|---|---|---|---|---|---|---|---|---|
| 0 | 0 | 0 | 1 | | 0 | 0 | 0 | 0 | | 0 | 1 | 1 | 1 | | 0 | 1 | 1 | 0 |
| 0 | 1 | 1 | 1 | $\oplus$ | 0 | 0 | 1 | 1 | $\oplus$ | 0 | 1 | 1 | 0 | = | 0 | 0 | 1 | 0 |
| 0 | 1 | 1 | 0 | | 0 | 0 | 1 | 1 | | 1 | 1 | 0 | 1 | | 1 | 0 | 0 | 0 |
| 1 | 1 | 0 | 1 | | 1 | 1 | 1 | 0 | | 0 | 0 | 0 | 0 | | 0 | 0 | 1 | 1 |

The values taken out from the resulted matrix, the table 3-4-6, are "11100000." It meets one most length with p=5. Therefore, the first field of the password diffused matrix, $^1w$="1100000," is verified.

The $2^{nd}$ field of the password diffused matrix: "01100111."

Take the $2^{nd}$ field of the password binary matrix, table 1-2: 11110110 and rearranged in accordance with the table 3-2 and implemented the first point s=1 (4,4) diffusion.

| Table 3-4-6 | | | | | | | | | | | | | | | | Table 3-4-7 | | | |
|---|---|---|---|---|---|---|---|---|---|---|---|---|---|---|---|---|---|---|---|
| 1 | 1 | 1 | 1 | | 1 | 1 | 1 | 0 | | 0 | 1 | 1 | 0 | | 0 | 1 | 1 | 1 |
| 0 | 1 | 1 | 0 | $\oplus$ | 1 | 1 | 0 | 0 | $\oplus$ | 1 | 1 | 1 | 1 | = | 0 | 1 | 0 | 1 |

| Table 3-4-6 | | | | | | | | | | | | Table 3-4-7 | | | |
|---|---|---|---|---|---|---|---|---|---|---|---|---|---|---|---|
| 1 | 1 | 1 | 1 | 1 | 1 | 1 | 0 | 1 | 1 | 1 | 1 | 1 | 1 | 1 | 0 |
| 1 | 1 | 1 | 1 | 1 | 1 | 1 | 1 | 0 | 0 | 0 | 0 | 0 | 0 | 0 | 0 |

The values taken out from the resulted matrix, the table 3-4-7, are "01100111." It meets the condition of one most length p=3. Therefore, the $2^{nd}$ field of the password diffused matrix, $^2w$="01100111," is verified.

The $3^{rd}$ field of the password diffused matrix: "00111001."
Take the $3^{rd}$ field of the password binary matrix, table 1-2: 10101110 and rearranged in accordance with the table 3-2 and implemented with the first point s=1 (4,4) diffusion.

| Table 3-4-8 | | | | | | | | | | | | | | | | | | Table 3-4-9 | | | |
|---|---|---|---|---|---|---|---|---|---|---|---|---|---|---|---|---|---|---|---|---|---|
| 1 | 0 | 1 | 1 | | 0 | 1 | 1 | 0 | | 1 | 1 | 1 | 0 | | 0 | 0 | 1 | 1 |
| 1 | 1 | 1 | 0 | ⊕ | 1 | 1 | 0 | 0 | ⊕ | 1 | 1 | 1 | 1 | = | 1 | 1 | 0 | 1 |
| 1 | 1 | 1 | 1 | | 1 | 1 | 1 | 0 | | 0 | 1 | 1 | 1 | | 0 | 1 | 1 | 0 |
| 0 | 1 | 1 | 1 | | 1 | 1 | 1 | 1 | | 0 | 0 | 0 | 0 | | 1 | 0 | 0 | 0 |

The values taken out from the resulted matrix, the table 3-4-9, are "00111111." It meets one most length with p=6 but it does not meet the condition that p is at most equal 5.

The table 3-4-9 is then rearranged according to the regular order position table 3-2-1 to obtain a newel matrix table 3-4-10 for s=2, the point (2,1) diffusion.

| Table 3-4-10 | | | | | | | | | | | | | | | | | | Table 3-4-11 | | | |
|---|---|---|---|---|---|---|---|---|---|---|---|---|---|---|---|---|---|---|---|---|---|
| 0 | 1 | 0 | 1 | | 1 | 1 | 1 | 0 | | 0 | 0 | 0 | 0 | | 1 | 0 | 1 | 1 |
| 0 | 1 | 0 | 0 | ⊕ | 1 | 0 | 1 | 0 | ⊕ | 0 | 1 | 0 | 1 | = | 1 | 0 | 1 | 1 |
| 1 | 1 | 1 | 0 | | 1 | 0 | 1 | 1 | | 0 | 1 | 0 | 0 | | 0 | 0 | 0 | 1 |
| 1 | 1 | 0 | 0 | | 1 | 0 | 1 | 0 | | 1 | 1 | 1 | 0 | | 1 | 0 | 0 | 0 |

The values taken out from the resulted matrix, the table 3-4-11, are "00111001." It meets one most length with p=3. Therefore, the first field of the password diffused matrix, $^3w$="00111001," is generated.

TABLE 3-5

| 1 | 0 | 0 | 1 | 1 | 1 | 1 | 0 |
|---|---|---|---|---|---|---|---|
| 1 | 1 | 0 | 0 | 0 | 1 | 1 | 0 |
| 1 | 1 | 1 | 0 | 1 | 1 | 0 | 0 |
| 0 | 0 | 1 | 1 | 0 | 1 | 1 | 1 |
| 0 | 0 | 1 | 1 | 0 | 0 | 1 | 1 |
| 0 | 1 | 0 | 1 | 1 | 0 | 1 | 1 |
| 0 | 1 | 0 | 1 | 1 | 0 | 1 | 1 |
| 0 | 1 | 1 | 1 | 1 | 1 | 1 | 1 |

According to the password diffused matrix of Table 3-5, the "1" or "0" of the password diffused matrix having the most successive positions is used as the starting point for the diffusion, and the successive number is used as the diffused length p as shown in Table 3-6:

TABLE 3-6

| | $1^{st}$ Column | $2^{nd}$ Column | $3^{rd}$ Column | $4^{th}$ Column | $5^{th}$ Column | $6^{th}$ Column | $7^{th}$ Column | $8^{th}$ Column |
|---|---|---|---|---|---|---|---|---|
| Starting Point for Diffusion | 4 | 6 | 3 | 4 | 6 | 1 | 4 | 4 |
| Diffused Length p | 5 | 3 | 3 | 5 | 3 | 4 | 5 | 5 |
| Cycle r | 240 | 48 | 48 | 240 | 48 | 224 | 240 | 240 |

To enumerate the processes for obtaining the ciphertext binary matrix, the table 3-7, and simplify the listings, only the mathematic formulas are listed as follows:

According to table 3-6, to get the $1^{st}$ column of the password diffused matrix, starting point for diffusion is (1,4), the diffused length p=5, cycle=240. Thus the number of times the encryption is equal to (240/2)−1=119. It is thus:

$$A(1,4)_5 = A(1,4)(1,5)(1,6)(1,7)(1,8);$$

where A is a plaintext binary matrix
let $$A_1 = A(1,4), A_2 = A_1(1,5), A_3 = A_2(1,6),$$

$$A_4 = A_3(1,7), A_5 = A_4(1,8) = A(1,4)_5$$

$$A(\overset{2}{1},4)_5 = A_5(1,4)(1,5)(1,6)(1,7)(1,8)$$

$$A_6 = A_5(1,4), A_7 = A_6(1,5), A_8 = A_7(1,6),$$

$$A_9 = A_8(1,7), A_{10} = A_9(1,8) = A(\overset{2}{1},4)_5$$

$$A(\overset{24}{1},4)_5 = A_{115}(1,4)(1,5)(1,6)(1,7)(1,8)$$

$$A_{116} = A_{115}(1,4), A_{117} = A_{116}(1,5),$$

$$A_{118} = A_{117}(1,6), A_{119} = A_{118}(1,7) = {}^1A$$

$^1A$ is the ciphertext binary matrix by using the first field of the password diffused matrix.

To get the $^2A$ from $^1A$, the number of times of the encryption from the 2nd field of the password diffused matrix is equal to (48/2)−1=23 since p=3 and cycle=48 in accordance with the table 3-6.

The starting point for diffusion is (2,6). Parts of equations are listed as follows:

$${}^1A(2,6)_3 = {}^1A(2,6)(2,7)(2,8)$$

$${}^1A_1 = {}^1A(2,6), {}^1A_2 = {}^1A_1(2,7), {}^1A_3 = {}^1A_2(2,8) = {}^1A(2,6)_3$$

$${}^1A(\overset{2}{2},6)_3 = {}^1A_3(2,6)(2,7)(2,8)$$

$${}^1A_4 = {}^1A_3(2,6), {}^1A_5 = {}^1A_4(2,7), {}^1A_6 = {}^1A_5(2,8) = {}^1A(\overset{2}{2},6)_3$$

$${}^1A(\overset{8}{2},6)_3 = {}^1A_{21}(2,6)(2,7)(2,8)$$

$${}^1A_{22} = {}^1A_{21}(2,6), {}^1A_{23} = {}^1A_{22}(2,7) = {}^2A$$

Similarly, we can get the ciphertext binary matrix $^3A$ to $^8A$ as above. For example to get the $^8A$ from $^7A$, the number of times of the encryption from the 8th field of the password diffused matrix is equal to 240/2−1=119 and the parts of processes are listed as follows:

$${}^7A(8,4)_5 = {}^7A(8,4)(8,5)(8,6)(8,7)(8,8)$$

$${}^7A_1 = {}^7A(8,4), {}^7A_2 = {}^7A_1(8,5), {}^7A_3 = {}^7A_2(8,6),$$

$${}^7A_4 = {}^7A_3(8,7), {}^7A_5 = {}^7A_4(8,8) = {}^7A(8,4)_5$$

$${}^7A(\overset{2}{8},4)_5 = {}^7A_5(8,4)(8,5)(8,6)(8,7)(8,8)$$

$${}^7A_6 = {}^7A_5(8,4), {}^7A_7 = {}^7A_6(8,5), {}^7A_8 = {}^7A_7(8,6),$$

$${}^7A_9 = {}^7A_8(8,7), {}^7A_{10} = {}^7A_9(8,8) = {}^7A(\overset{2}{8},4)_5$$

$${}^7A(\overset{24}{8},4)_5 = {}^7A_{115}(8,4)(8,5)(8,6)(8,7)(8,8)$$

$${}^7A_{116} = {}^7A_{115}(8,4), {}^7A_{117} = {}^7A_{116}(8,5),$$

$${}^7A_{118} = {}^7A_{117}(8,6), {}^7A_{119} = {}^7A_{118}(8,7) = {}^8A$$

where $^8A$ is the target cipher text binary matrix.

After the starting point for diffusion, diffused length p and cycle r for each field are obtained from the foregoing password, the plaintext binary table is encrypted and diffused. The encryption and diffusion described by the following example.

In the password diffused matrix, the starting point for the diffusion of the first field of the 2D plaintext matrix is 4 and the diffused length p is 5. Therefore, Points (1,4) (1,5) (1,6) (1,7) (1,8) are taken in sequence to produce the encryption and diffusion, The number of times of the encryption is equal to (cycle r)/2−1, which is 119 times. After the first field is encrypted and diffused, then perform the encryption and diffusion for the $2^{nd}$ field, the $3^{rd}$ field, the $4^{th}$ field, and so forth to obtain the ciphertext as shown in Table 3-7 below:

TABLE 3-7

| 1 | 0 | 1 | 0 | 1 | 1 | 1 | 1 |
|---|---|---|---|---|---|---|---|
| 0 | 0 | 0 | 1 | 0 | 0 | 0 | 1 |
| 0 | 0 | 1 | 0 | 0 | 1 | 1 | 0 |
| 0 | 0 | 1 | 1 | 1 | 1 | 0 | 0 |
| 1 | 1 | 1 | 0 | 0 | 0 | 1 | 1 |
| 0 | 0 | 0 | 1 | 1 | 1 | 0 | 1 |
| 1 | 1 | 0 | 1 | 1 | 1 | 0 | 0 |
| 0 | 0 | 0 | 0 | 0 | 1 | 0 | 0 |

The decryption processes for the ciphertext binary matrix are just reversal processes of the encryption, the number of decryption for each field is equal to (cycle r/2)+1 so that the sum of the number of times of decryption and diffusion and the number of times of encryption equal to the cycle r in order to obtain the original plaintext.

Figure 2B:
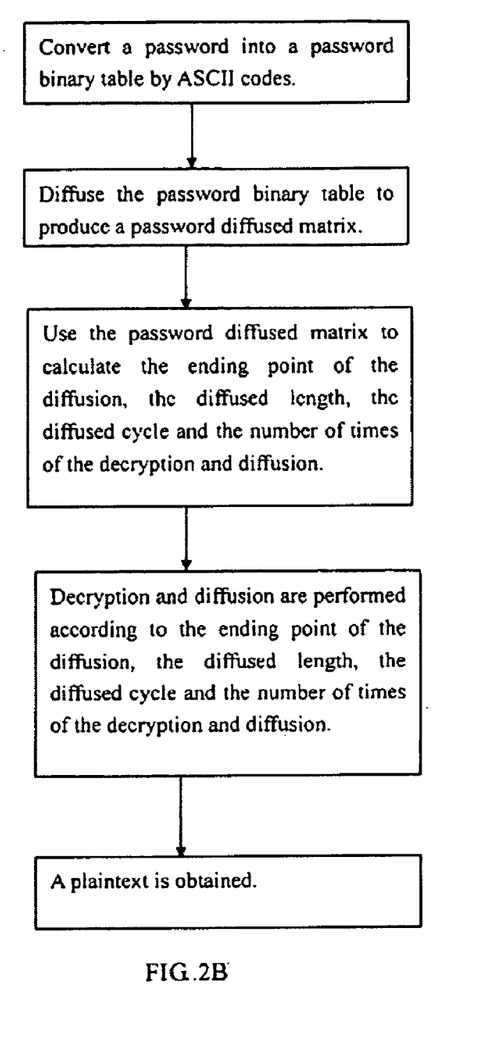
FIG. 2B is another flow chart of performing the decrypted diffusion computation according to the present invention.

Please refer to FIG. 2B for the flow chart of a decryption according to the present invention, and its algorithm is given as follows:

1. Convert the ciphertext and the password into the ciphertext binary table and the password binary table.
2. The $n^{th}$ field of the ciphertext is taken as the diffused field, where n=8~1.
3. Use the $n^{th}$ field in the password diffused matrix to carry out the decryption and diffusion from the next position of the last point of the encryption, and the number of times of the diffusion is equal to (Cycle r/2)+1

Therefore, the decryption is starting from $^7A_{119}={}^7A_{118}(8,7)={}^8A$, as forgoing depicted the $^8A$ is the target ciphertext binary matrix.

$$^8A_1 = {}^8A(8, 8)$$

$$^8A_1(8, 4)\underset{5}{} = {}^8A_1(8, 4)(8, 5)(8, 6)(8, 7)(8, 8)$$

$$^8A_2 = {}^8A_1(8, 4), {}^8A_3 = {}^8A_2(8, 5), {}^8A_4 = {}^8A_3(8, 6),$$

$$^8A_5 = {}^8A_4(8, 7), {}^8A_6 = {}^8A_5(8, 8) = {}^8A_1(8, 4)\underset{5}{}$$

$$^8A_1(\overset{2}{8}, 4)\underset{5}{} = {}^8A_6(8, 4)(8, 5)(8, 6)(8, 7)(8, 8)$$

$$^8A_7 = {}^8A_6(8, 4), {}^8A_8 = {}^8A_7(8, 5), {}^8A_9 = {}^8A_8(8, 6),$$

$$^8A_{10} = {}^8A_9(8, 7), {}^8A_{11} = {}^8A_{10}(8, 8) = {}^8A_1(\overset{2}{8}, 4)\underset{5}{}$$

$$^8A_1(\overset{24}{8}, 4)\underset{5}{} = {}^8A_{116}(8, 4)(8, 5)(8, 6)(8, 7)(8, 8)$$

$$^8A_{117} = {}^8A_{116}(8, 4), {}^8A_{118} = {}^8A_{117}(8, 5), {}^8A_{119} = {}^8A_{118}(8, 6),$$

$$^8A_{120} = {}^8A_{119}(8, 7), {}^8A_{121} = {}^8A_{120}(8, 8) = {}^7A$$

Similarly, the processes of the decryption are proceeded till the first field is decrypted. Herein some of the processes are shown. For example the second field of the password diffused matrix, has successive diffusion length p=3 and the starting position is point (2,8) and the diffused cycle is 48. Therefore the repeated diffused time for single point is 25 for decryption and the resulted matrix is still a ciphertext but is ciphertext $^1A$ instead.

$$^2A_1 = {}^2A(2, 8)$$

$$^2A_1(2, 6)\underset{3}{} = {}^2A_1(2, 6)(2, 7)(2, 8)$$

$$^2A_2 = {}^2A_1(2, 6), {}^2A_3 = {}^2A_2(2, 7), {}^2A_4 = {}^2A_3(2, 8) = {}^2A_1(2, 6)\underset{3}{}$$

$$^2A(\overset{2}{2}, 6)\underset{3}{} = {}^2A_4(2, 6)(2, 7)(2, 8)$$

$$^2A_5 = {}^2A_4(2, 6), {}^2A_6 = {}^2A_5(2, 7), {}^2A_7 = {}^2A_6(2, 8) = {}^2A_1(\overset{2}{2}, 6)\underset{3}{}$$

$$^2A_1(\overset{8}{8}, 6)\underset{3}{} = {}^2A_{22}(2, 6)(2, 7)(2, 8)$$

$$^2A_{23} = {}^2A_{22}(2, 6), {}^2A_{24} = {}^2A_{23}(2, 7), {}^2A_{25} = {}^2A_{24}(2, 8) = {}^1A$$

To decrypt $^1A$, the diffused map is the first field of password diffused matrix, the successive diffusion length p=5, cycle=240 and the starting position is point (1,8). Therefore the repeated diffused time for single point is 121 for decryption and the resulted matrix is a target plaintext binary matrix A $$^1A_1 = {}^1A(1, 8)$$

$$^1A_1(1, 4)\underset{5}{} = {}^1A_1(1, 4)(1, 5)(1, 6)(1, 7)(1, 8)$$

$$^1A_2 = {}^1A_1(1, 4), {}^1A_3 = {}^1A_2(1, 5), {}^1A_4 = {}^1A_3(1, 6),$$

$$^1A_5 = {}^1A_4(1, 7), {}^1A_6 = {}^1A_5(1, 8) = {}^1A_1(1, 4)\underset{5}{}$$

-continued $$^1A_1(\overset{2}{1}, 4)\underset{5}{} = {}^1A_6(1, 4)(1, 5)(1, 6)(1, 7)(1, 8)$$

$$^1A_7 = {}^1A_6(1, 4), {}^1A_8 = {}^1A_7(1, 5), {}^1A_9 = {}^1A_8(1, 6),$$

$$^1A_{10} = {}^1A_9(1, 7), {}^1A_{11} = {}^1A_{10}(1, 8) = {}^1A_1(\overset{2}{1}, 4)\underset{5}{}$$

$$^1A_1(\overset{24}{1}, 4)\underset{5}{} = {}^1A_{116}(1, 4)(1, 5)(1, 6)(1, 7)(1, 8)$$

$$^1A_{117} = {}^1A_{116}(1, 4), {}^1A_{118} = {}^1A_{117}(1, 5),$$

$$^1A_{119} = {}^1A_{118}(1, 6), {}^1A_{120} = {}^1A_{119}(1, 7), {}^1$$

$$A_{121} = {}^1A_{120}(1, 8) = A$$

If the user has the ciphertext and the password, then the password is computed similarly according to the foregoing computation to obtain the starting point of diffusion, diffused length p, cycle r and last point of encrypted diffusion for each field during the encryption, the ciphertext can be decrypted in the reverse sequence. In the password diffused matrix, since the starting point for diffusion of the $8^{th}$ field of the diffused ciphertext is (8,4) and the diffused length p is 5 and the number of times for encryption and diffusion is 119, the last point for the diffusion of the original encryption and diffusion is (8,7). Therefore, the starting point of the decryption is (8,8) and the number of times for decryption and diffusion is 121, and Points (8,8) (8,4) (8,5) (8,6) and (8,7) are decrypted and diffused in sequence for 121 times. After the decryption and diffusion for the $8^{th}$ field is completed, the $7^{th}$ field, $6^{th}$ field, the $5^{th}$ field and so forth of the ciphertext are decrypted and diffused in sequence to obtain the original plaintext.

The aforementioned first and second preferred embodiments can be used separately or jointly. The same plaintext is encrypted according to the password binary table of the first preferred embodiment, and then encrypted according to the password diffused matrix of the second preferred embodiment. For decryption, it only needs to reverse the procedure of the two preferred embodiments for the decryption to obtain the original plaintext. The method of simultaneously using both encryptions and diffusions provides a double protection mechanism to the ciphertext as to further improve the security of the ciphertext.

Figure 3A:
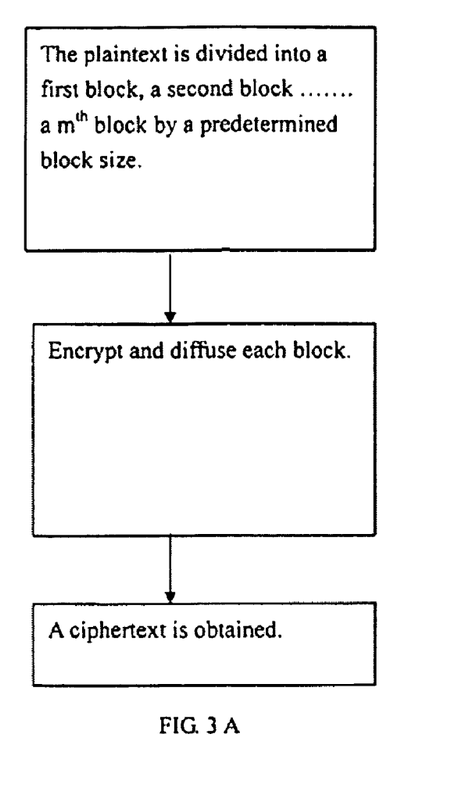
FIG. 3A is a flow chart of performing the encrypted diffusion computation of the whole text according to the present invention.

Further, this invention can apply the aforementioned principle of encryption and decryption to further process the encryption and decryption of the full text. A block size of the 8×8 matrix is taken for example and described as follows:

Electronic Code Book (ECB) Mode:

In FIG. 3A, if the number of bits of the plaintext is far larger than that of the password, the plaintext can be divided into a first plaintext block, a second plaintext block . . . a $m^{th}$ plaintext block. For example, if the password has 64 bits and the plaintext has 192 bits, then the plaintext is divided by a first plaintext block, a second plaintext block and a third plaintext block, each having 64 bits, and each plaintext block is encrypted and diffused to obtain a first ciphertext, a second ciphertext and a third ciphertext and finally these three ciphertexts are combined into a full ciphertext of 192 bits.

Figure 3B:
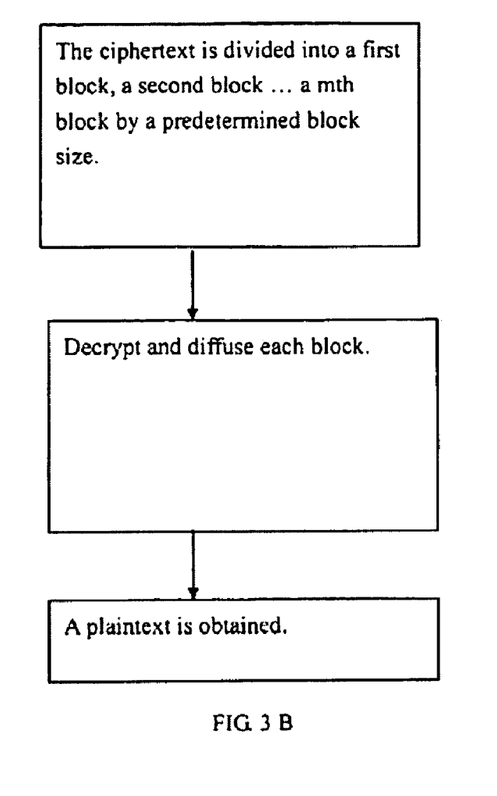
FIG. 3B is a flow chart of performing the decrypted diffusion computation of the whole text according to the present invention.

Similarly, in the decryption and diffusion process as shown in FIG. 3B, the ciphertext of 192 bits is divided into a first ciphertext block, a second ciphertext block and a third ciphertext block each having 64 bits, and then each ciphertext block is encrypted and diffused by the password to obtain a first plaintext block, a second plaintext block and a third plaintext block, and these plaintext blocks combined into the original plaintext. Since the size of the plaintext is not a multiple of the predetermined size, therefore after the plaintext is divided by the predetermined size in sequence, insufficient blocks will be produced. Then, zeros can be filled to make up the last plaintext block to facilitate the encryption and decryption operations.

Figure 4:
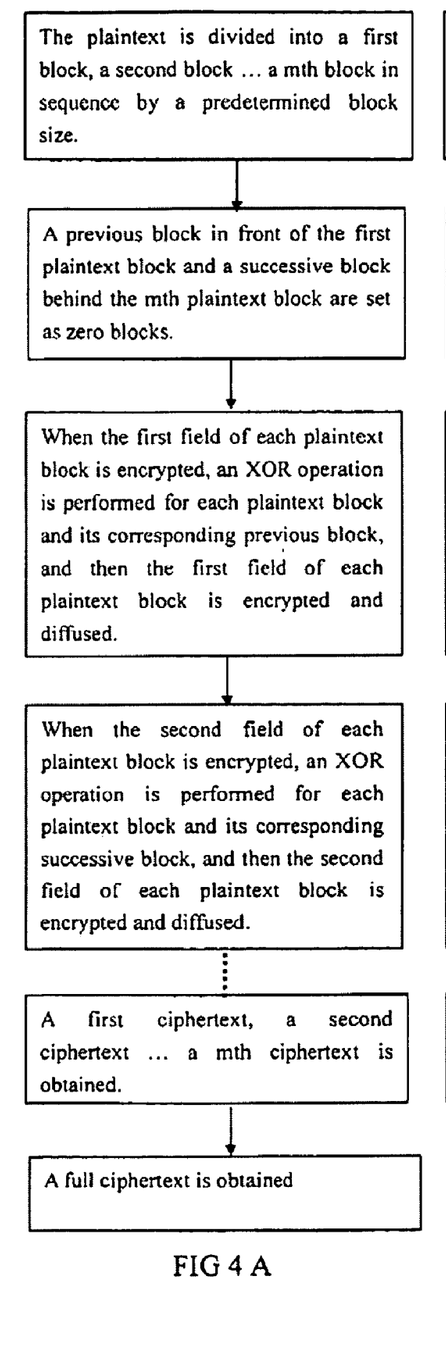
FIG. 4A is a flow chart of performing the encrypted diffusion computation of another whole text according to the present invention.
FIG. 4B is a flow chart of performing the decrypted diffusion computation of another whole text according to the present invention.

Chain Block Coding (CBC) Mode 1:

Please refer to FIG. 4A for another full text encryption and decryption according to the present invention. The plaintext of the full text is divided into a first plaintext block, a second plaintext block . . . a $m^{th}$ plaintext block by a predetermined size, and the block in front of the first plaintext block is set to be a zero block (having zeros in the block), and block behind the $m^{th}$ plaintext block is also set to be a zero block. Then, all the plaintext blocks are encrypted at the same time. When the first field is encrypted, an XOR operation is performed for each plaintext block and its previous block, and then the first field is diffused; and then the second field is encrypted, and an XOR operation is performed for each plaintext block and its successive block, and the second field is diffused, and so on. If the number of fields is odd and an XOR operation is performed for each block and its previous block, then the fields are diffused. If the number of fields is even and an XOR operation is performed for each block and its successive block, then the fields are diffused. After all fields are encrypted in sequence to obtain a first ciphertext, a second ciphertext . . . a $m^{th}$ ciphertext and these ciphertexts are combined into a full ciphertext.

In FIG. 4B, if the full ciphertext is decrypted, the full ciphertext is divided into a first ciphertext, a second ciphertext . . . a $m^{th}$ ciphertext by a predetermined size, and the block in front of the first ciphertext is set as the zero block and the block after the $m^{th}$ ciphertext is also set as the zero block. All ciphertexts are decrypted at the same time. Firstly, after the $8^{th}$ fields of all ciphertext are decrypted and the $8^{th}$ field is diffused, an XOR operation is performed for each ciphertext and its successive block, and then the $7^{th}$ field is decrypted. After the $7^{th}$ field is diffused, an XOR operation is performed for each ciphertext and its previous block, and so forth.

If the number of fields is even and the fields are diffused, then an XOR operation is performed for each ciphertext and its successive block. If the number of fields is odd and the fields are diffused, then an XOR operation is performed for each ciphertext and its previous block. After all fields are decrypted in a reverse sequence to obtain a first plaintext, a second plaintext . . . a $m^{th}$ plaintext and these plaintexts are combined into a full plaintext.

Figure 5A:
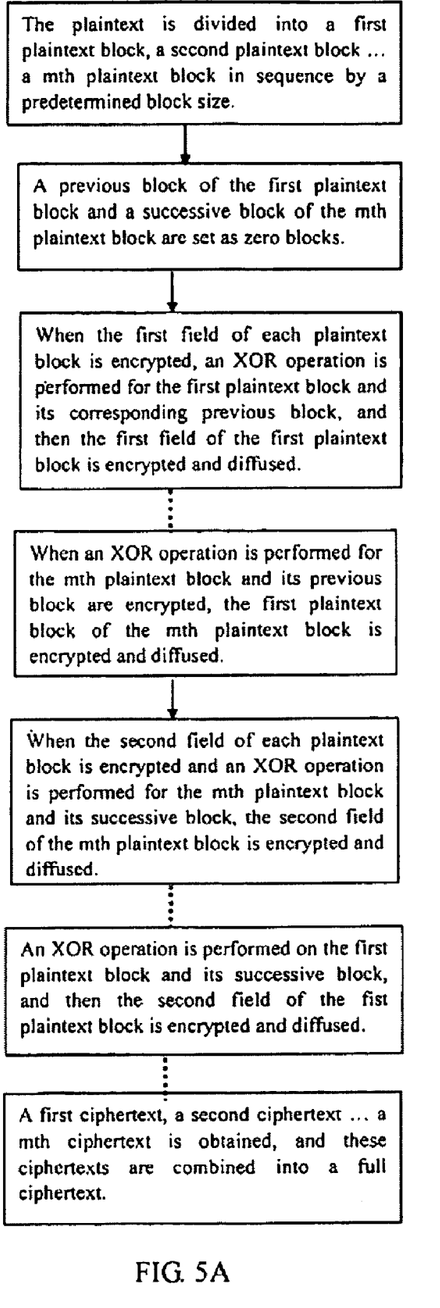
FIG. 5A is a flow chart of performing the encrypted diffusion computation of another further whole text according to the present invention.

Chain Block Coding (CBC) Mode 2:

Please refer to FIG. 5A for a further full text encryption method according to the present invention. The full text of the plaintext is divided into a first plaintext block, a second plaintext block . . . a $m^{th}$ plaintext block by a predetermined size first. The block in front of the first plaintext block is set to be a zero block and the block behind the $m^{th}$ block is also set to be a zero block. Each block is encrypted in sequence. The first field is encrypted first, an XOR operation is performed for the first plaintext block and its previous block, and then the first field of the first plaintext block is diffused. Similarly, the first field of the second plaintext block goes through the same procedure until the first field of the $m^{th}$ plaintext block is processed. When the second field is encrypted and an XOR operation is performed for the $m^{th}$ plaintext block and its successive block. The second field of the $m^{th}$ plaintext block is diffused. Similarly, the second field of the $m-1\_1^{th}$ block goes through same procedure until the second field of the first plaintext block is processed, and so on. If the number of fields is odd, blocks in sequence, an XOR operation is performed for each plaintext block and its previous block, and then a particular field of a particular plaintext block is diffused. If the number of fields is even blocks in a reverse order, an XOR operation is performed for each plaintext block and its successive block, and then that particular field of that particular plaintext block is diffused. After all fields are encrypted in sequence to obtain a first ciphertext, a second ciphertext . . . a $m^{th}$ ciphertext and these ciphertexts are combined into a full ciphertext.

Figure 5B:
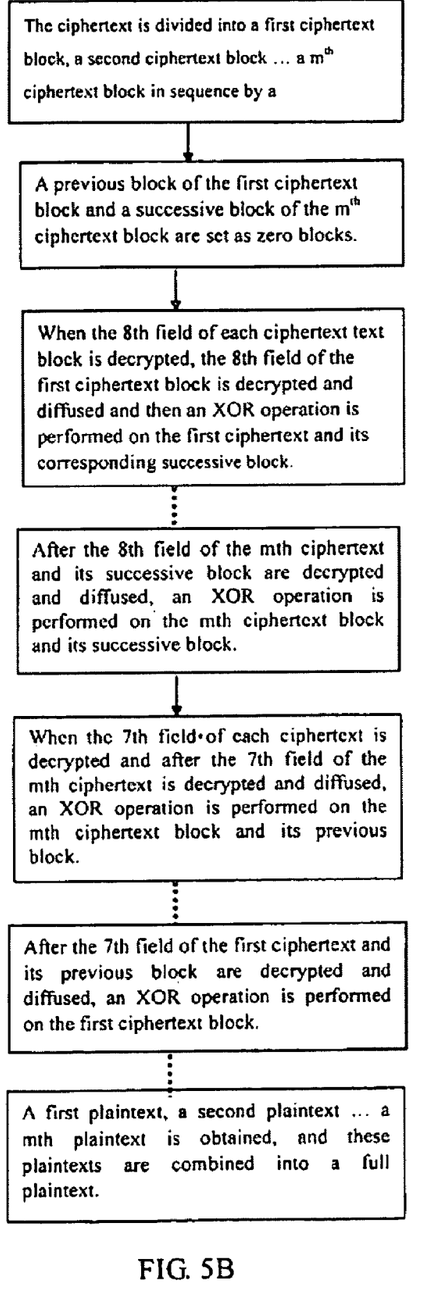
FIG. 5B is a flow chart of performing the decrypted diffusion computation of another further whole text according to the present invention.

In FIG. 5B, when the full text of the ciphertext is decrypted and diffused, the full ciphertext is divided into a first ciphertext, a second ciphertext . . . a $m^{th}$ ciphertext by a predetermined size, and the block in front of the first ciphertext is set as the zero block and the block after the $m^{th}$ ciphertext is also set as the zero block. Each ciphertext is decrypted in sequence. Firstly, after the $8^{th}$ fields of the first ciphertext is decrypted and the $8^{th}$ field of the first ciphertext is diffused, an XOR operation is performed for the first ciphertext and its successive block, and then the $8^{th}$ field of the second ciphertext goes through the same procedure until the $8^{th}$ field of the $m^{th}$ ciphertext is decrypted. Then the $7^{th}$ field is decrypted and after the $7^{th}$ field of the $m^{th}$ ciphertext is diffused, an XOR operation is performed for the $m^{th}$ ciphertext and its previous block. The $7^{th}$ field of the $m-1^{th}$ ciphertext is processed until the $7^{th}$ field of the first ciphertext is done, and so forth. If the number of fields is even and a field is taken out and diffused, then an XOR operation is performed for each ciphertext and its successive block. If the number of fields is odd and a ciphertext is taken out in reverse sequence and diffused, then an XOR operation is performed for that ciphertext and its previous block. After all fields are decrypted in a reverse sequence to obtain a first plaintext, a second plaintext . . . a $m^{th}$ plaintext and these plaintexts are combined into a full plaintext.

Figure 6A:
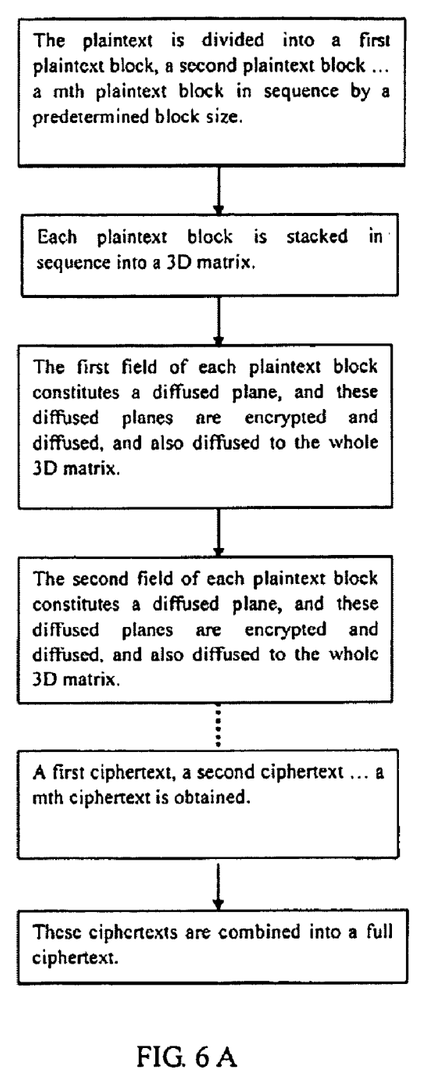
FIG. 6A is a flow chart of performing the 3-dimensional encrypted diffusion computation of another whole text according to the present invention.

Chain Block Coding (CBC) Mode 3:

Please refer to FIG. 6A for another further full text encryption according to the present invention. The full text having a size of 512 bits is taken for example, and the plaintext is divided into a first plaintext block, a second plaintext block . . . a $8^{th}$ plaintext block by a predetermined size of 64 bits. All plaintext blocks are stacked into an 8×8×8 cubic matrix. If the size of the plaintext is not a multiple of the predetermined size, zeros will be filled to make up the cubic matrix. If the size exceeds the cubic matrix, an additional cubic matrix can be created. In the encryption of a plaintext, each field of each block constitutes each diffusion plane, and the source of the diffused points for such diffusion planes is determined by the password for performing a 3D diffusion on the cubic matrix. The first field of all blocks is taken out in sequence to form a diffused plane, and the first diffused plane is used as the source of the diffused point by means of the password for the encryption and diffusion. The diffusion is extended from the first diffused plane to the entire cubic matrix. After all fields from the first diffused plane to the eighth diffused plane are encrypted to obtain a first ciphertext, a second ciphertext . . . a $m^{th}$ ciphertext and these ciphertexts are combined into a full ciphertext.

Figure 6B:
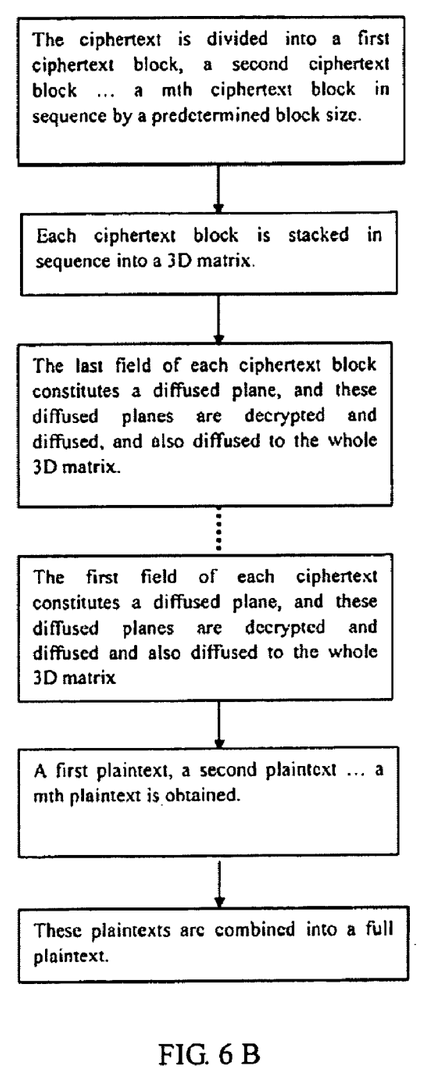
FIG. 6B is a flow chart of performing the 3-dimensional decrypted diffusion computation of another whole text according to the present invention.

In FIG. 6B, if the full ciphertext is decrypted and diffused, the full ciphertext is divided into a first ciphertext, a second ciphertext . . . a $m^{th}$ ciphertext by a predetermined size, and these ciphertexts are stacked to form a cubic matrix. Each field of the ciphertext constitutes each diffused plane, and each diffused plane is decrypted and diffused to the entire cube. All fields from the eighth diffused plane to the first diffused plane are decrypted in a reverse sequence to obtain a first plaintext block, a second plaintext block . . . a $m^{th}$ plaintext block, and these plaintext blocks are combined to form a full plaintext.

The foregoing embodiment diffuses and encrypts all fields of each plaintext block to form a diffused plane for the 3-dimensional diffusion and encryption, or aims at a certain field or several fields in a plane for the diffusion and encryption, which can greatly expedite the encryption and decryption processes. The foregoing cubic encryption and decryption method can be applied to 4-dimensional or n-dimensional encryption and diffusion.

The key point of this invention resides on using the password as the source of the diffused point to perform an encryption or a decryption on the plaintext binary matrix, and the method for determining the source of the diffused point is not limited to the aforementioned method of using a specific value "0" or "1" as the diffused point or the value of successive "0"s or "1"s as the diffused point, but also can apply the matrix diffusion of the password binary table to obtain the center of gravity of the plane after the diffusion of the password binary table for each time as to form the non-successive diffused positions of the plaintext, and its procedure is described as follows:

Center of Gravity:

$$x = \bar{x} = \frac{\sum_{i \in S} n_i x_i}{\sum_{i \in S} n_i}$$

$$y = \bar{y} = \frac{\sum_{i \in S} n_i y_i}{\sum_{i \in S} n_i}$$

$x_i$: Position of $x$, $n_i$: Number of 0s or 1s in that position $y_i$: Position of $y$, $n_i$: Number of 0s or 1s in that position $S$: Diffused Plane In the password binary table, the first quadrant represents that the center of gravity can be calculated as (4,4), and the plaintext position (4,4) is used as the diffused point for the diffusion. After the diffusion of the password table is repeated for several times, several diffused positions of the plaintext are determined. Since a non-continuous characteristic will occur at the center of gravity of the diffused matrix, therefore a non-continuous diffusion can be produced when the encryption and diffusion take place. The password can be diffused in the 2D diffusion or changed to a 3D diffusion, and then the 2D plane can be extended to find the center of gravity. The diffused point of the password can be determined by the position of a specific value or the position of the center of gravity.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A diffused data encryption/decryption processing method, wherein comprising the steps of:
   (a) providing a password binary matrix having a size of n by m bits therein and having w bits belonging to a first binary type;
   (b) collecting said w bits from said password binary matrix in a predetermined order sequence from k=1 to k=w for diffusion, every point $P_k$ forming individually a diffused zero matrix b(i, j);
   (c) providing a plaintext binary matrix A having a size of n by m bits therein, therefore said plaintext binary matrix A has a diffusion cycle r and sets a natural number q and $1 \leq q < r/2$;
   further, the said encryption processing method comprises the steps of:
   (d) letting k=1;
   (e) letting t=1;
   (f) performing one encryption process of single point diffusion from a point $P_k$ so as to obtain $A_{k-1}{}^t$ by a computing device, where $$A_{k-1}{}^t = A_{k-1}{}^{t-1}(i,j) = A_{k-1}{}^{t-1} \oplus A_{k-1}{}^{t-1} c_j \oplus A_{k-1}{}^{t-1} r_j \oplus b(i,j),$$

and δ is an XOR logic operator;
   (g) if t=(r/2)−q, then lets $A_k = A_{k-1}{}^t$, goes to the next step, otherwise, t=t+1, backs to the step (f); and
   (h) if k=w then the matrix $A_w = A_{w-1}{}^{(r/2)-q}$ is the required ciphertext binary matrix and ends said encryption processing method, otherwise, k=k+1, backs to the step (e).

2. The diffused data encryption/decryption processing method according to claim 1 wherein said password binary matrix and said plaintext binary matrix are obtained by converting the password, the plaintext using coded mode selected from the group consisting of ASCII, Unicode, BCD, UTF-32 and user defined binary code.

3. The diffused data encryption/decryption processing method according to claim 1 wherein the value of said r is according to the larger one in comparison with said n or m, and $r=2^{K+1}$ where k=max(n,m), $K=\lceil \log_2 k \rceil$.

4. The diffused data encryption/decryption processing method according to claim 1 wherein said zero matrix b(i, j) either with values 0 at all positions of the matrix except position (i, j) with value 1 or with values 1 at all positions of the matrix except position (i, j) with value 0.

5. The diffused data encryption/decryption processing method according to said claim 1 further comprising plaintext has a length larger than that of said password so that said plaintext binary matrix is divided into at least two plaintext blocks and each of them is encrypted by said password binary matrix into a ciphertext binary matrix individually.

6. The diffused data encryption/decryption processing method according to said claim 1, wherein said decryption processing method comprises the steps of:
   (d) letting k=w;
   (e) letting t=1;
   (f) performing one decryption process of single point diffusion from a point $P_k$ so as to obtain $A_k{}^t$ by a computing device, where $$A_k{}^t = A_k{}^{t-1}(i,j) = A_k{}^{t-1} \oplus A_k{}^{t-1} c_j \oplus A_k{}^{t-1} r_j \oplus b(i,j);$$

(g) if t=(r/2)+q, then lets $A_{k-1} = A_k{}^t$, goes to the next step, otherwise, t=t+1, backs to the step (f); and
   (h) if k=1 then the matrix $A = A_1{}^{(r/2)+q}$ is the required plaintext binary matrix and ends said decryption, otherwise, k=k−1, goes to the step (e).

7. A diffused data encryption/decryption processing method, wherein comprising the steps of:
   (a) providing a password binary matrix having a size of n fields by m rows of bits therein;
   (b) diffusing said password binary matrix to produce a password diffused matrix D, each field k of said password diffused matrix satisfying conditions of having one most successive length $p_k$ either "1" or "0" and having a diffused cycle $r_k$ according to said $p_k$ and a size of said password binary matrix and a starting diffused point of each field k is the first point of said most successive length $p_k$; occurrence and sets a natural number $q_k$ and $1 \leq q_k r_k / 2$;
   (c) providing a plaintext binary matrix A having n fields by m rows of bits;

further, the said encryption processing method comprises the steps of:
   (d) letting k=1;
   (e) performing processes of the $k^{th}$ field successive length diffusion so as to obtain $^k A$ by a computing device, where $$^k A = {}^{k-1}A \underset{p_k}{(i,\, j)}^{(r_k/2)-q_k} = {}^{k-1}A_{p_k}^{(r_k/2)-q_k};$$

(f) if k=n then "$A={}^{n-1}A_{p_n}^{(r_n/2)-q_n}$ is the target ciphertext binary matrix and ends said encryption processing method, otherwise goes to the next step;
   (g) letting k=k+1; and
   (h) going to the step (e).

8. The diffused data encryption/decryption method according to claim 7 wherein a size of said password diffused matrix is the same as said password binary matrix.

9. The diffused data encryption/decryption method according to claim 7 wherein said password binary matrix and said plaintext binary matrix are obtained by converting the password and the plaintext using its own coded mode so that said m depend on said code selected.

10. The diffused data encryption/decryption method according to claim 9 wherein the coded mode is ASCII so that the m=8 and the step (b) comprising the steps of:
   (a) providing a predetermined position matrix and a regular position matrix, both having a matrix size at least 2 by 4 so that said predetermined position matrix being filled in numerals 1 to 8 in a predetermined order, each predetermined position $P_s$ represents a diffused zero matrix b(i, j) and said regular position matrix being filled in numerals 1 to 8 in a increasing order as elements of said matrix regular position matrix;
   (b) letting w=1;
   (c) getting 8 bits from the $w^{th}$ field of said password binary matrix and rearranged them to obtain a matrix B according to said predetermined position matrix;
   (d) letting s=1;
   (e) performing single point diffusion process beginning from $P_s$=b(i, j) to obtain $B_s$ where $B_s = B \oplus Bc_i \oplus Br_j \oplus b(i, j)$;
   (f) taking a string with 8 bits from the $B_s$, according to the predetermined position matrix;
   (g) If said string has one most successive length either '1" or "0" then the string is the required string for the $w^{th}$ field, otherwise the matrix $B_s$ is rearranged to obtain a renewed matrix B according to the regular order matrix and lets s=s+1 backing to the step (e);
   (h) If w=n then the steps of obtaining the password diffused matrix is ended; and
   (i) letting w=w+1;
   (j) going back to the step (c).

11. The diffused data encryption/decryption method according to claim 7 wherein said decryption processing method comprises the steps of:
   (c) providing said password diffused matrix D, said ciphertext binary matrix $^n A$;
   (d) letting k=n;
   (e) performing processes of the $k^{th}$ field successive length diffusion so as to obtain $^{k-1}A$ by a computing device, where said $$^{k-1}A = {}^k A \underset{p_k}{(i,\, j)}^{(r_k/2)+q_k} = {}^k A_{p_k}^{(r_k/2)+q_k};$$

(f) if k=1 then $A={}^1 A_{p_1}^{(r_1/2)+q_1}$ is the target plaintext binary matrix and ends said decryption processing method, otherwise goes to the next step;
   (g) letting k=k−1; and
   (h) going to the step (e).

* * * * *